(12) United States Patent
Genise et al.

(10) Patent No.: US 6,500,093 B2
(45) Date of Patent: Dec. 31, 2002

(54) AUTOMATED TRANSMISSION SYSTEM CONTROL WITH ZERO ENGINE FLYWHEEL TORQUE DETERMINATION

(75) Inventors: Thomas A. Genise, Dearborn; Ronald K. Markyvech, Allen Park; James R. McReynolds, Richland, all of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/289,391

(22) Filed: Apr. 12, 1999

(65) Prior Publication Data

US 2002/0055413 A1 May 9, 2002

Related U.S. Application Data

(60) Division of application No. 08/666,164, filed on Jun. 19, 1996, which is a continuation-in-part of application No. 08/649,830, filed on Apr. 30, 1996, now Pat. No. 5,735,771, which is a continuation-in-part of application No. 08/649,831, filed on Apr. 30, 1996, which is a continuation-in-part of application No. 08/649,833, filed on Apr. 30, 1996.

(51) Int. Cl.$^7$ .............................................. B60K 41/08
(52) U.S. Cl. ..................................................... 477/109
(58) Field of Search .............................. 477/109, 110, 477/111

(56) References Cited

U.S. PATENT DOCUMENTS

| | | | |
|---|---|---|---|
| 4,361,060 A | 11/1982 | Smyth | 74/866 |
| 4,593,580 A | 6/1986 | Schulze | 74/858 |
| 4,595,986 A | 6/1986 | Daubenspeck et al. | 364/424.1 |
| 4,773,693 A | 9/1988 | Premji et al. | 296/65.1 |
| 4,850,236 A | 7/1989 | Braun | 74/337 |
| 4,865,377 A | 9/1989 | Musser et al. | 296/65.1 |
| 4,971,379 A | 11/1990 | Rumpel et al. | 296/63 |
| 5,022,698 A | 6/1991 | Butt et al. | 296/65.1 |
| 5,053,959 A | 10/1991 | Genise | 74/866 |
| 5,053,961 A | 10/1991 | Genise | 364/424.1 |
| 5,224,750 A | 7/1993 | Clark et al. | 296/65.1 |
| 5,390,561 A | 2/1995 | Stine | 74/331 |
| 5,482,345 A | 1/1996 | Bolsworth et al. | 297/336 X |
| 5,487,005 A | 1/1996 | Genise | 364/424.1 |
| 5,508,916 A | 4/1996 | Markyvech et al. | 364/424.1 |
| 5,509,867 A | 4/1996 | Genise | 477/120 |
| 5,562,322 A | 10/1996 | Christoffel | 297/336 X |
| 5,569,115 A | 10/1996 | Desautels, et al. | 477/110 |
| 5,571,059 A | 11/1996 | Desautels et al. | 477/111 |
| 5,573,477 A | 11/1996 | Desautels et al. | 477/109 |
| 5,582,558 A | 12/1996 | Palmeri et al. | 477/109 |

Primary Examiner—Dirk Wright
(74) Attorney, Agent, or Firm—Sughrue Mion, PLLC

(57) ABSTRACT

A control system/method for an at least partially automated transmission system (100) includes means to determine engine fueling required to cause a gross engine output torque ($T_{EG}$ (for zero flywheel torque)) resulting in zero flywheel torque ($T_{FW}=0$). The engine (102) is caused to be fueled to the level required to cause zero flywheel torque at certain predetermined conditions, such as, for example, when disengaging a currently engaged ratio or during throttle recovery.

35 Claims, 11 Drawing Sheets

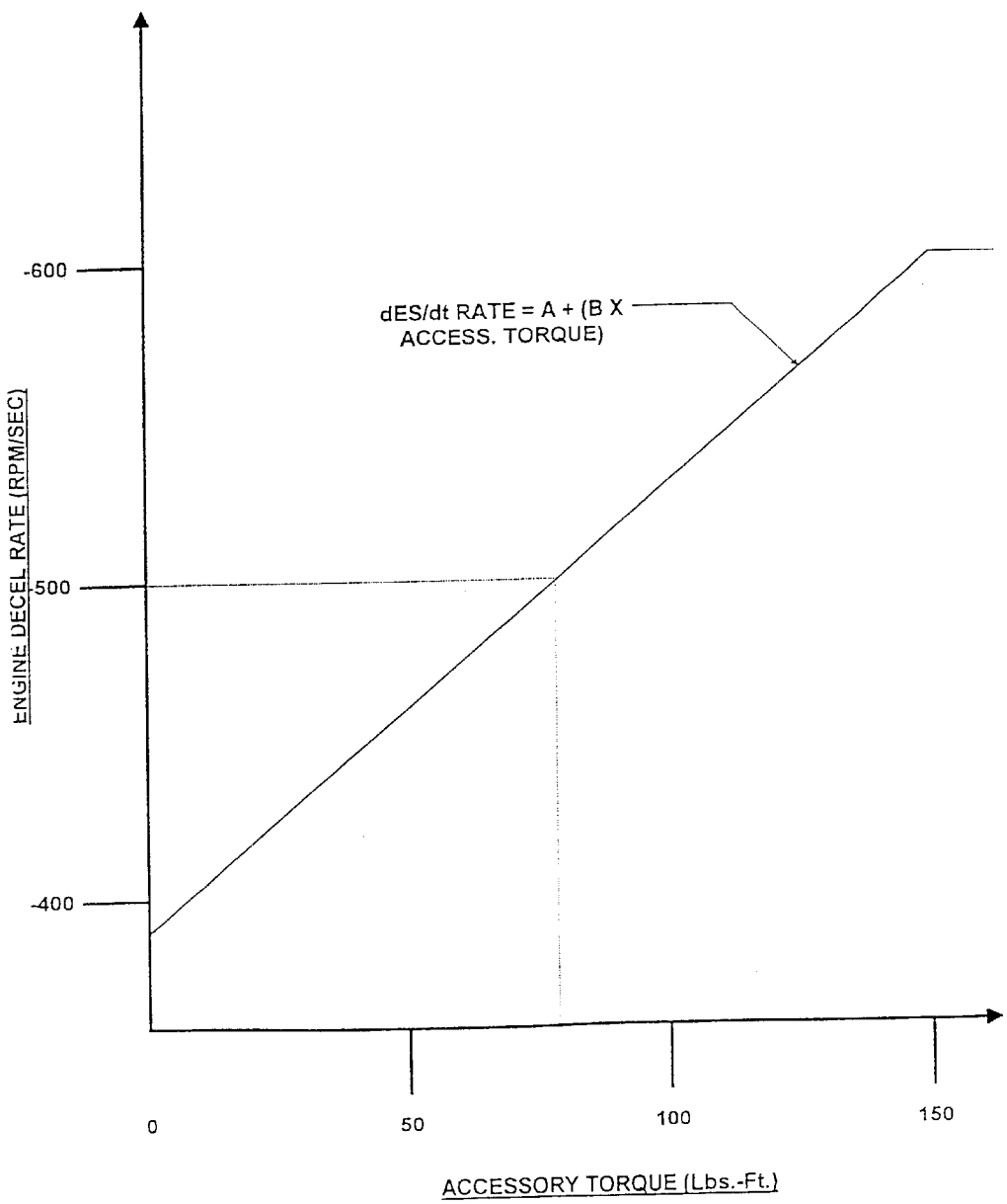

AUTOMATED TRANSMISSION SYSTEM CONTROL WITH ZERO ENGINE FLYWHEEL TORQUE DETERMINATION

RELATED APPLICATIONS

This application is related to U.S. patent application Ser. Nos. 08/242,824 and 08/309,713, both assigned to EATON CORPORATION, the assignee of this application. This application is a divisional of application Ser. No. 08/666,164, filed Jun. 19, 1996, the disclosure of which is incorporated herein by reference, which is a continuation-in-part of application Ser. No. 08/649,830 now U.S. Pat. No. 5,735,771, Ser. Nos. 08/649,831 and 08/649,833, each filed Apr. 30, 1996.

BACKGROUND OF THE INVENTION

1. Field of the Invention

The present invention relates to shift control methods/systems for at least partially automated vehicular mechanical transmission systems including control techniques wherein the engine gross output torque required to cause zero drive line torque (i.e., zero flywheel torque) under current vehicle operating conditions is determined and, under various predetermined conditions, the engine is caused to generate such gross output torque. The shift control of the present invention uses torque information from the engine (preferably an electronic engine communicating over an electronic data link), along with vehicle and/or engine acceleration information, to determine various control parameters.

2. Description of the Prior Art

Fully automatic and semi-automatic vehicular mechanical transmission systems and fully or partially automated shift implementation systems utilizing electronic control units, usually microprocessor-based controllers, are known in the prior art. Examples of such automated mechanical transmission systems may be seen by reference to U.S. Pat. Nos. 3,961,546; 4,361,060; 4,425,620; 4,595,986; 4,631,679; 4,648,290; 4,722,248; 5,038,627; 5,050,079; 5,053,959; 5,053,961; 5,053,962; 5,063,511; 5,081,588; 5,089,962; 5,089,965; 5,133,229; 5,172,609; 5,231,582; 5,272,939; 5,335,566; 5,435,212; 5,508,916 and 5,509,867, the disclosures of which are incorporated herein by reference.

In accordance with an improved vehicular transmission control, an at least partially automated vehicular mechanical transmission system which accurately determined a value indicative of engine flywheel torque under current vehicle operating conditions was provided. That control is particularly useful for vehicular automated mechanical transmission systems communicating with an electronically controlled internal combustion engine by means of a data link of the type conforming to an industry-established protocol similar to SAE J 1922, SAE J 1939 or ISO 11898.

In a preferred embodiment of the improved control, the foregoing was accomplished in a vehicular automated mechanical transmission system control by utilizing the relationship that:

$$T_{EG} = T_{FW} + T_{BEF} + T_{ACCES} + T_{ACCEL}$$

where:

$T_{EG}$=gross engine torque;

$T_{FW}$=engine flywheel torque;

$T_{BEF}$=base engine friction torque (includes the torque to overcome engine internal friction and the torque to rotate the engine manufacturer-installed accessories (i.e., water pump, oil pump, etc.));

$T_{ACCES}$=accessory torque (torque to operate vehicle accessories, such as air-conditioning, fans, lights, etc.); and $T_{ACCEL}$=torque to accelerate engine, calculated from engine acceleration or deceleration and moment of inertia (I) of engine.

Instantaneous values representative of gross engine torque ($T_{EG}$) and base engine friction torque ($T_{BEF}$) are available on the data link. $T_{ACCEL}$ is determined from sensed engine acceleration (which may be negative) and a calibrated moment of inertia (I) of the engine. Accessory torque ($T_{ACCES}$) is a constantly determined value which, Applicant has determined, may be taken as net engine torque (i.e., $T_{EG}-T_{BEF}$) if the vehicle is idling with the transmission in neutral and is related to engine deceleration rate in a known, substantially linear manner when the vehicle is in motion.

An adaptive control system/method for an at least partially automated vehicular mechanical transmission system which continuously updates the value of a control parameter ($T_{FW}$) indicative of flywheel torque may be seen by reference to aforementioned U.S. Pat. No. 5,509,867.

SUMMARY OF THE INVENTION

In accordance with the present invention, Applicant has determined that under certain predetermined vehicle operating conditions, transmission performance may be improved by causing flywheel torque (which is generally equal to drive line torque with the master clutch engaged) to equal zero or substantially zero, that the gross engine output torque $T_{EG}$ required to cause a zero flywheel torque condition under the current vehicle operating conditions may be determined, and that the engine may be controlled to generate such a gross engine output torque.

Accordingly, it is an object of the present invention to provide a control for at least partially automated transmission systems wherein, under predetermined operating conditions, gross engine output torque is caused to equal a value which, under sensed vehicle operating conditions, will result in a zero engine flywheel/drive line torque.

This and other objects and advantages of the present invention will become apparent from a reading of the detailed description of the preferred embodiment taken in connection with the attached drawings.

BRIEF DESCRIPTION OF THE DRAWINGS

FIG. 7 is a graphical representation of an assumed linear relationship between engine accessory torque and engine deceleration.

DESCRIPTION OF THE PREFERRED EMBODIMENT

Figure 1:
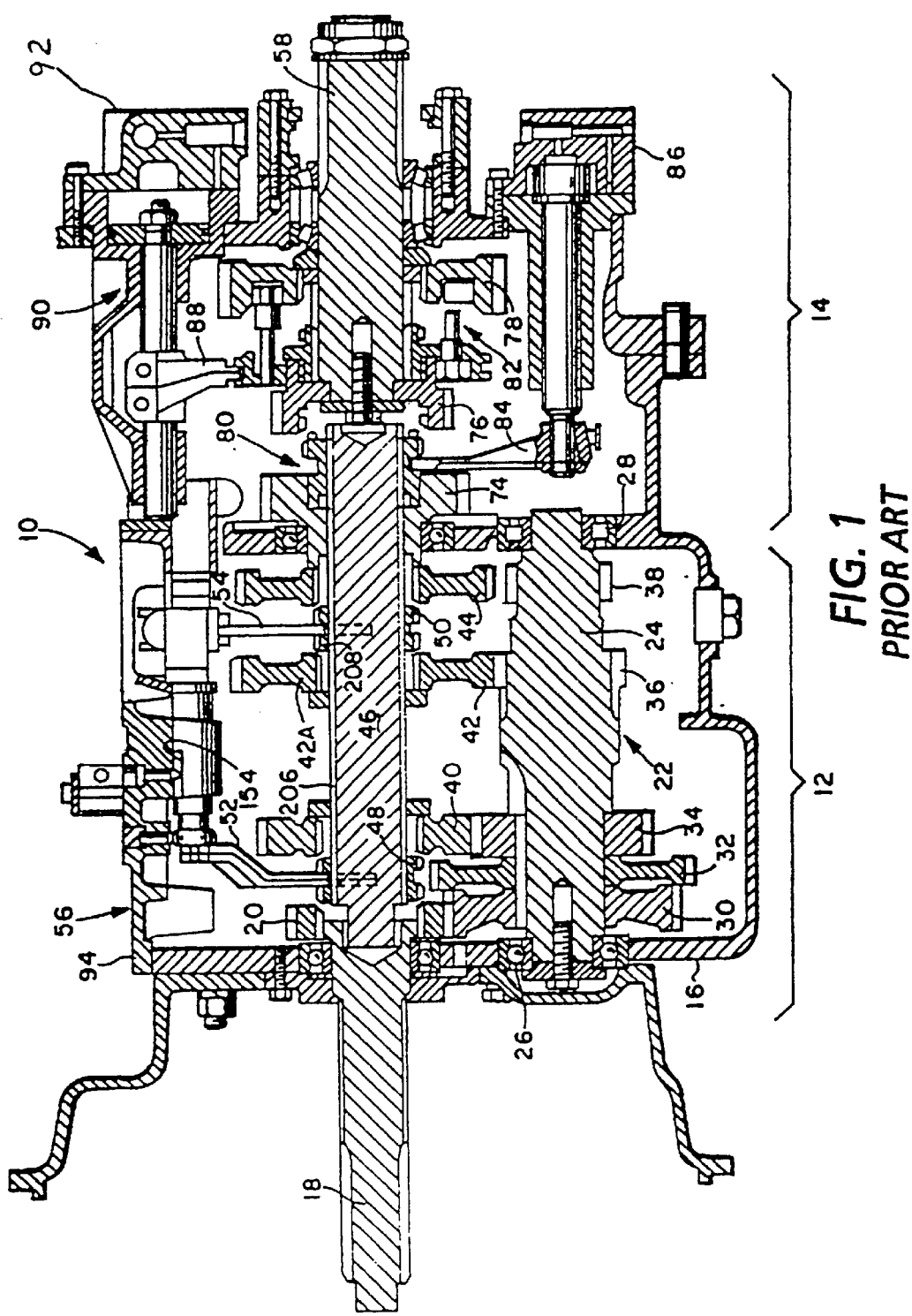
FIGS. 1 and 1A are a plan view of a combined range-and-splitter-type compound transmission.

Certain terminology will be used in the following description for convenience in reference only and will not be limiting. The words "upwardly," "downwardly," "rightwardly" and "leftwardly" will designate directions in the drawings to which reference is made. The words "forward" and "rearward" will refer, respectively, to the front and rear ends of the transmission as conventionally mounted in a vehicle, being respectively from the left and right sides of the transmission illustrated in FIG. 1. The words "inwardly" and "outwardly" will refer, respectively, to directions toward and away from the geometric center of the device and designated parts thereof. Said terminology will include the words above specifically mentioned, derivatives thereof and words of similar import.

The term "compound transmission" is used to designate a change-speed or change-gear transmission having a main transmission section and an auxiliary drive train unit, such as an auxiliary transmission section, connected in series whereby the selected gear reduction in the main transmission section may be compounded by further selected gear reduction in the auxiliary transmission section. The term "upshift" as used herein shall mean the shifting from a lower speed gear ratio to a higher speed gear ratio, and the term "downshift" as used herein shall mean the shifting from a higher speed gear ratio to a lower speed gear ratio.

Figure 1A:
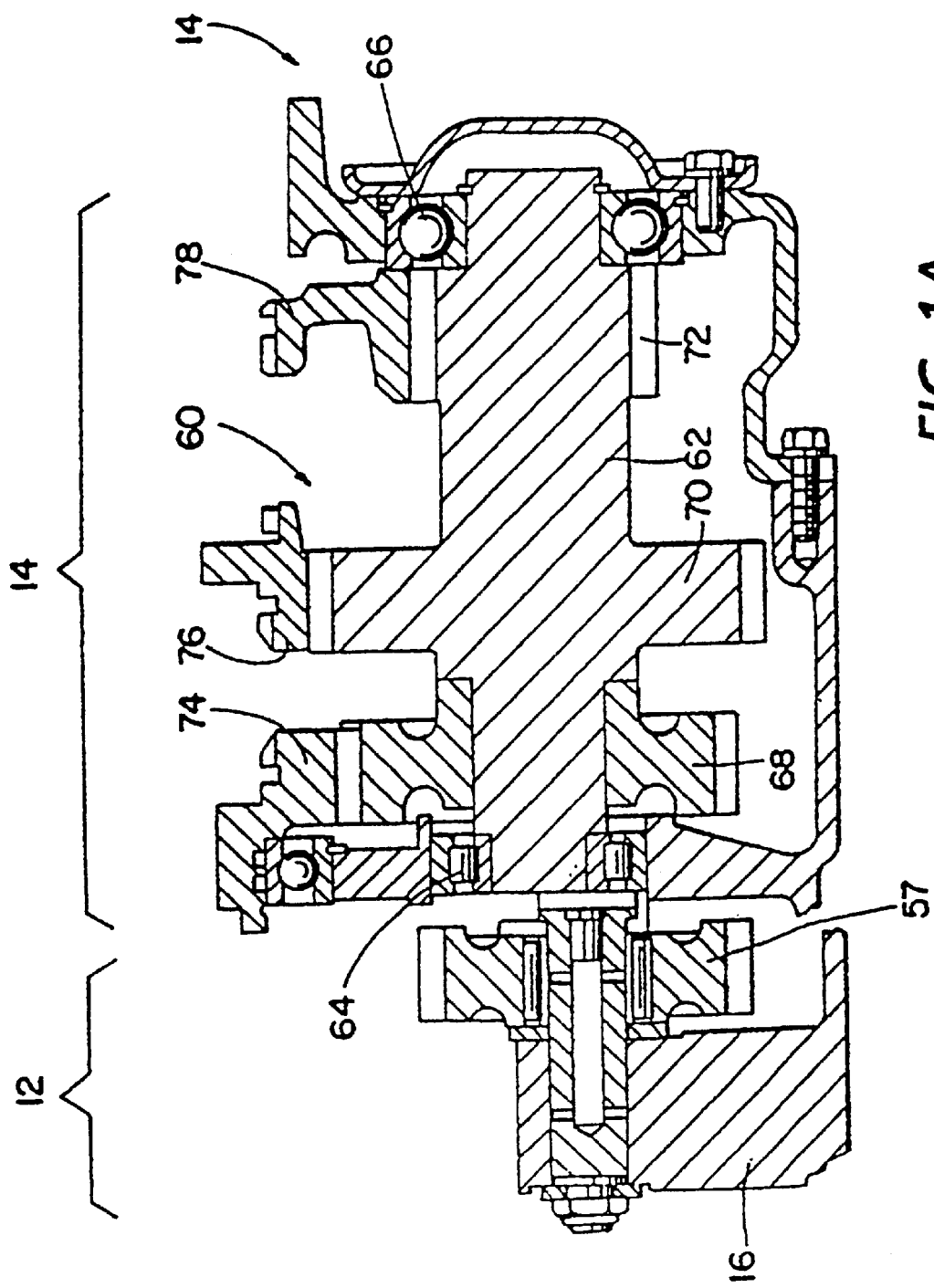

FIGS. 1 and 1A illustrate a combined range-and-splitter-type compound transmission 10 which is especially well suited for control by the control system/method of the present invention. Transmission 10 comprises a main transmission section 12 connected in series with an auxiliary transmission section 14 having both range- and splitter-type gearing. Typically, transmission 10 is housed within a single multi-piece housing 16 and includes an input shaft 18 driven by a prime mover, such as a diesel engine, through a selectively disengaged, normally engaged, master friction clutch.

In the main transmission section 12, the input shaft 18 carries an input gear 20 for driving at least one countershaft assembly 22. Preferably, as is well known in the prior art and as is illustrated in U.S. Pat. Nos. 3,105,395 and 3,335,616, the disclosures of which are incorporated herein by reference, input gear 20 simultaneously drives a plurality of substantially identical main section countershaft assemblies at substantially identical rotational speeds. Each of the main section countershaft assemblies comprises a main section countershaft 24 supported by bearings 26 and 28 in housing 16 and is provided with main section countershaft gears 30, 32, 34, 36 and 38 fixed thereto. A plurality of main section drive or mainshaft gears 40, 42 and 44 surround the transmission mainshaft 46 and are selectively clutchable, one at a time, to the mainshaft 46 for rotation therewith by sliding clutch collars 48 and 50, as is well known in the art. Clutch collar 48 also may be utilized to clutch input gear 20 to the mainshaft 46 to provide a direct drive relationship between the input shaft 18 and the mainshaft 46. Typically, clutch collars 48 and 50 are axially positioned by means of shift forks or yokes 52 and 54, respectively, associated with a shift bar housing assembly 56, which may be of the multiple-shift-rail or single-shift-shaft type, as is known in the prior art, and which is manually controlled by a shift lever 57. Clutch collars 48 and 50 are, in the preferred embodiment, of the well-known, non-synchronized, double-acting jaw clutch type.

Main section mainshaft gear 44 is the reverse gear and is in continuous meshing engagement with countershaft gears 38 by means of conventional intermediate idler gears 57 (see FIG. 1A). Main section countershaft gear 32 is provided for powering power takeoff devices and the like. Jaw clutches 48 and 50 are three-position clutches in that they may be positioned in a centered axially non-displaced, non-engaged position, as illustrated, or in a fully rightwardly engaged or fully leftwardly engaged position.

Auxiliary transmission section 14 is connected in series with main transmission section 12 and is of the three-layer, four-speed combined splitter/range type, as illustrated in U.S. Pat. Nos. 4,754,665 and 5,390,561, the disclosures of which are incorporated herein by reference. Mainshaft 46 extends into the auxiliary section 14 and is journalled in the inward end of the output shaft 58, which extends from the rearward end of the transmission.

Auxiliary transmission section 14 includes a plurality of substantially identical auxiliary countershaft assemblies 60 (see FIG. 1A), each comprising an auxiliary countershaft 62 supported by bearings 64 and 66 in-housing 16 and carrying three auxiliary section countershaft gears 68, 70 and 72 fixed for rotation therewith. Auxiliary countershaft gears 68 are constantly meshed with and support auxiliary section splitter gear 74. Auxiliary countershaft gears 70 are constantly meshed with and support auxiliary section splitter/range gear 76 which surrounds the output shaft 58 at the end thereof adjacent the coaxial inner end of mainshaft 46. Auxiliary section countershaft gears 72 constantly mesh with and support auxiliary section range gear 78, which surrounds the output shaft 58.

A sliding double-sided jaw clutch collar 80 is utilized to selectively couple either the splitter gear 74 or the splitter/range gear 76 to the mainshaft 46, while a two-position synchronized clutch assembly 82 is utilized to selectively couple the splitter/range gear 76 or the range gear 78 to the output shaft 58. The structure and function of double-acting jaw clutch collar 80 is substantially identical to the structure and function of the sliding clutch collars 48 and 50 utilized in the main transmission section 12, and the function of double-acting synchronized clutch assembly 82 is substantially identical to the structure and function of prior art double-acting synchronized clutch assembly, examples of which may be seen by reference to U.S. Pat. Nos. 4,125,179 and 4,462,489, the disclosures of which are incorporated herein by reference.

The splitter jaw clutch 80 is a two-sided or double-acting clutch assembly which may be selectively positioned in the rightwardmost or leftwardmost positions for engaging either gear 76 or gear 74, respectively, to the mainshaft 46. In the prior art, the splitter jaw clutch 80 is axially positioned by means of a shift fork 84 controlled by a two-position piston actuator 86, which is operable by a driver selection switch (such as a button or the like) on the shift knob, as is known in the prior art. Two-position synchronized clutch assembly 82 also is a two-position clutch which may be selectively positioned in either the rightwardmost or leftwardmost positions thereof for selectively clutching either gear 78 or 76, respectively, to output shaft 58. Clutch assembly 82 is positioned by means of a shift fork 88 operated by means of a two-position piston device 90.

Figure 2:
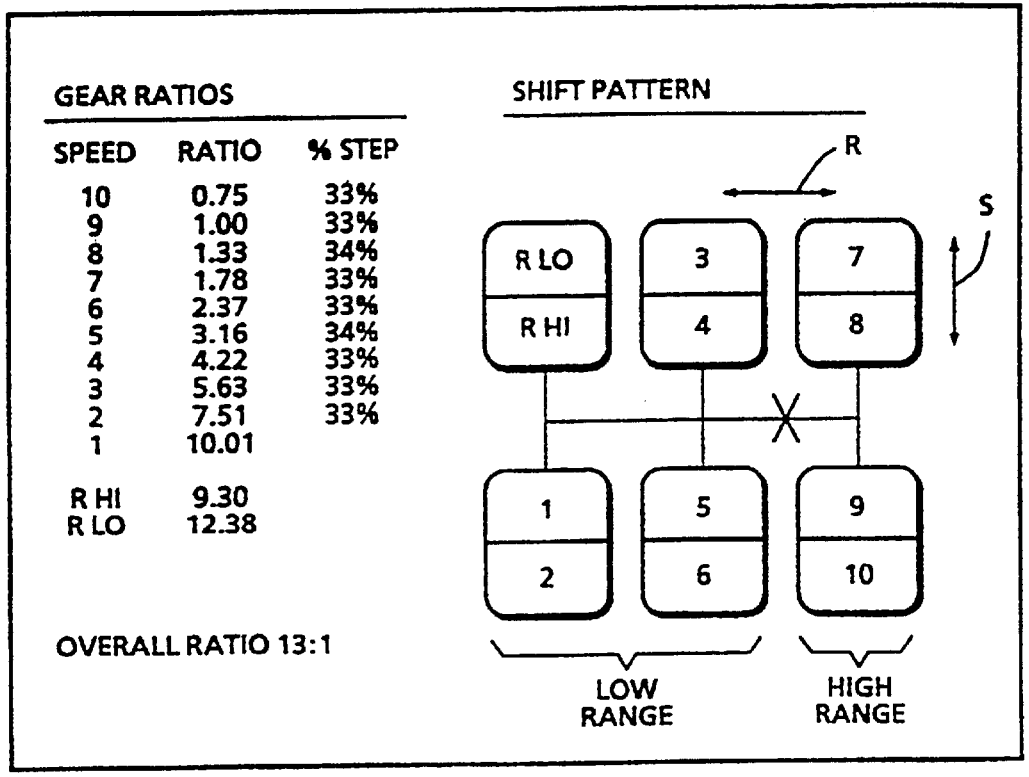
FIG. 2 illustrates a prior art shift pattern for the transmission of FIG. 1.

As may be seen by reference to FIGS. 1–2, by selectively axially positioning both the splitter clutch 80 and the range clutch 82 in the forward and rearward axial positions thereof, four distinct ratios of mainshaft rotation to output shaft rotation may be provided. Accordingly, auxiliary transmission section 14 is a three-layer auxiliary section of the combined range-and-splitter type providing four selectable speeds or drive ratios between the input (mainshaft 46) and output (output shaft 58) thereof The main section 12 provides a reverse and three potentially selectable forward speeds. However, one of the selectable main section forward gear ratios, the low speed gear ratios associated with mainshaft gear 42, is not utilized in the high range. Thus, transmission 10 is properly designated as a "(2+1)×(2)×(2)" type transmission providing nine or ten selectable forward speeds, depending upon the desirability and practicality of splitting the low gear ratio. While clutch 82, the range clutch, should be a synchronized clutch, double-acting clutch collar 80, the splitter clutch, is not required to be synchronized.

According to the prior art, as disclosed in aforementioned U.S. Pat. No. 4,944,197, the main section ratios are selected and implemented manually by a shift lever, splitter shifts are manually selected by operation of a manual selector lever or button, often located on the shift lever or built into the shift knob, and are implemented by a remote two-position actuator. The range shift is manually or automatically selected and implemented by a remote two-position actuator. A separate range control button/lever may be provided, or as illustrated in FIG. 2, a lever operated "double-H" type control may be utilized. Range and splitter actuators and controls of this type are well known in the prior art, as may be seen by reference to U.S. Pat. No. 4,788,889, the disclosure of which is incorporated herein by reference.

The prior art shift pattern for shifting transmission 10 is schematically illustrated in FIG. 2. Divisions in the vertical direction at each gear lever position signify splitter shifts, while movement in the horizontal direction from the 3/4 and 5/6 leg of the "H" pattern to the 7/8 and 9/10 leg of the "H" pattern signifies a shift from the low range to the high range of the transmission.

To accomplish a shifting of the range section of the transmission 10 without requiring the operator to actuate any control device other than the gear lever movements to the rightwardmost leg of the shift pattern as seen in FIG. 2, a range control valve assembly is provided to provide a signal to a slave valve 92, located at piston assembly 90, to shift the shift fork 88.

Figure 3:
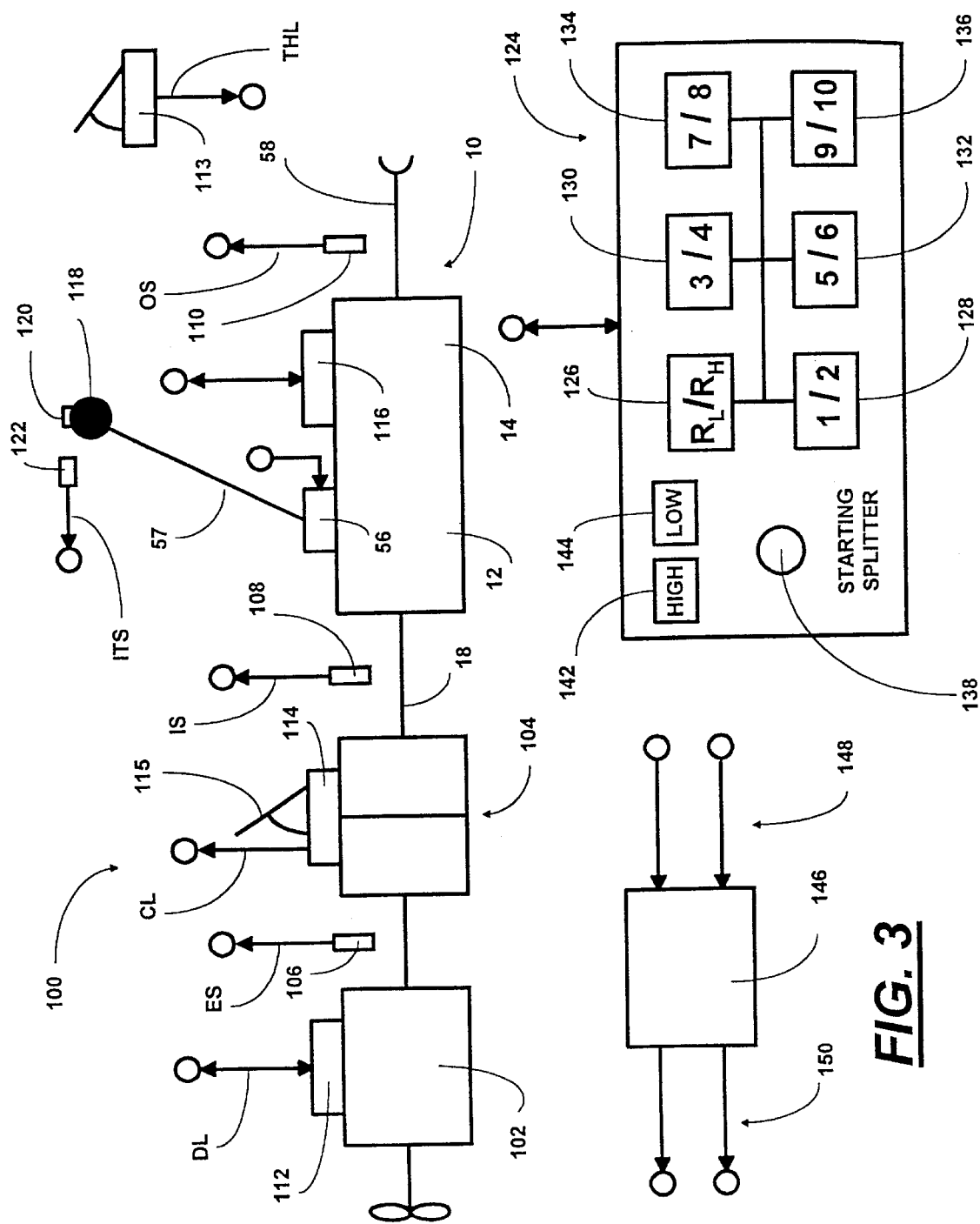
FIG. 3 is a schematic illustration, in block diagram format, of a semi-automated shift implementation transmission system advantageously utilizing the control of the present invention.

In one embodiment of the present invention, the forward shifting of transmission 10, comprising a main section 12 coupled to an auxiliary section 14, is semi-automatically implemented by the vehicular semiautomatic transmission system 100, illustrated in FIG. 3. Main section 12 includes input shaft 18, which is operatively coupled to the drive or crank shaft of the vehicle engine 102 by master clutch 104, and output shaft 58 of auxiliary section 14 is operatively coupled, commonly by means of a drive shaft, to the drive wheels of the vehicle (not shown).

The change-gear ratios available from main transmission section 12 are manually selectable by positioning the shift lever 57 according to the shift pattern prescribed to engage the particular change gear ratio of main section 12 desired. As will be described, manipulation of the master clutch 104 and manual synchronizing is not required. Preferably, the system will include means to sense an intent to shift and will automatically take actions to minimize or relieve torque-lock conditions, allowing an easier shift into main section neutral from the engaged main section ratio and further allowing required splitter shifts to be preselected for rapid completion upon a torque break and shift into neutral.

The system 100 includes sensors 106 for sensing engine rotational speed (ES), 108 for sensing input shaft rotational speed (IS), and 110 for sensing output shaft rotational speed (OS) and providing signals indicative thereof. Engine 102 is electronically controlled, including an electronic controller 112 communicating over an electronic data link (DL) operating under an industry standard protocol such as SAE J-1922, SAE J-1939, ISO 11898 or the like. Throttle position (operator demand) is a desirable parameter for selecting shifting points and in other control logic. A separate throttle position sensor 113 may be provided or throttle position (THL) may be sensed from the data link. Gross engine torque ($T_{EG}$) and base engine friction torque ($T_{BEF}$) also are available on the data link.

A manual clutch pedal 115 controls the master clutch, and a sensor 114 provides a signal (CL) indicative of clutch-engaged or -disengaged condition. The condition of the clutch also may be determined by comparing engine speed to input shaft speed. A splitter actuator 116 is provided for operating the splitter clutch 82 in accordance with command output signals. The shift lever 57 has a knob 118 which contains sensing means or a button 120 by which a driver's intent to shift may be sensed. Sensor 122 provides a signal (ITS) indicative of the sensed presence or absence of the driver's intent to shift into neutral. Various other sensors sensing movement of the shift lever may be utilized, as may be seen by reference to SAE Paper No. 840307.

A driver's control display unit 124 includes a graphic representation of the six-position shift pattern with individually lightable buttons or other display elements 126, 128, 130, 132, 134 and 136 representing each of the selectable engagement positions. The unit also includes a button 138 connected to toggle-type controls for selecting the high or low splitter range for start-from-stop splitter position selection. The selection will be indicated by lights 142 or 144.

The system includes a control unit 146, preferably a microprocessor-based control unit of the type illustrated in aforementioned U.S. Pat. Nos. 4,595,986; 4,361,065 and 5,335,566, for receiving input signals and processing same according to predetermined logic rules to issue command output signals 150 to system actuators, such as the splitter section actuator 116, the engine controller 112 and the display unit 124. A separate system controller 146 may be utilized, or the engine (ECU) 112 communicating over an electronic data link may be utilized.

The splitter actuator 116 may be a two-position device or, as shown in copending patent application U.S. Ser. No. 08/597,304, a three-position device, allowing a selectable and maintainable splitter section neutral.

Forward dynamic splitter-only shifts, such as third-to-fourth and fourth-to-third shifts, are automatically implemented without driver intervention. By way of example, assuming a three-position splitter actuator, upon sensing that a splitter shift is required, the ECU 146 will issue commands to the actuator 116 to bias the actuator toward neutral, and to engine controller 112 to minimize or break torque. As soon as splitter neutral is sensed, the engine will be commanded to a synchronous engine speed for the target gear ratio at current output shaft speed ($ES=IS=OS*GR_T \pm E_{RROR}$). The engagement is timed, in view of reaction times and shaft speeds and accelerations, to occur just off synchronous to prevent clutch butting. Automatic splitter shifting of this type is illustrated in aforementioned U.S. Pat. No. 4,722,248 and 5,435,212.

The engaged and neutral (not engaged) conditions of transmission 10 may be sensed by comparing the input shaft/output shaft rotational speeds to known gear ratios ($IS/OS=GR_i=1$ to $10 \pm Y$?) for a period of time. Position sensors may be utilized in lieu of or in addition to input shaft and output shaft speed logic.

When synchronizing to engage a target ratio, the engine is directed to achieve and remain at a speed about 30 to 100 RPM (preferably about 60 RPM) above or below (preferably below) true synchronous speed ($ES_{SYNCHRO}=(OS \times GR_T)-45$ RPM) to achieve a good quality jaw clutch engagement without butting. To verify engagement of a target ratio, the system looks for input shaft speed equaling the product of output shaft speed and the numerical value of the target ratio, plus or minus about 10 to 30 RPM ($IS=(OS*GR_T)\pm20$ RPM) for a period of time, about 100 to 400 milliseconds.

The foregoing logic allows transmission engaged and neutral conditions to be determined on the basis of input and output shaft speeds without false engagement sensing caused by engine synchronizing for engagement of a target ratio.

Figure 4:
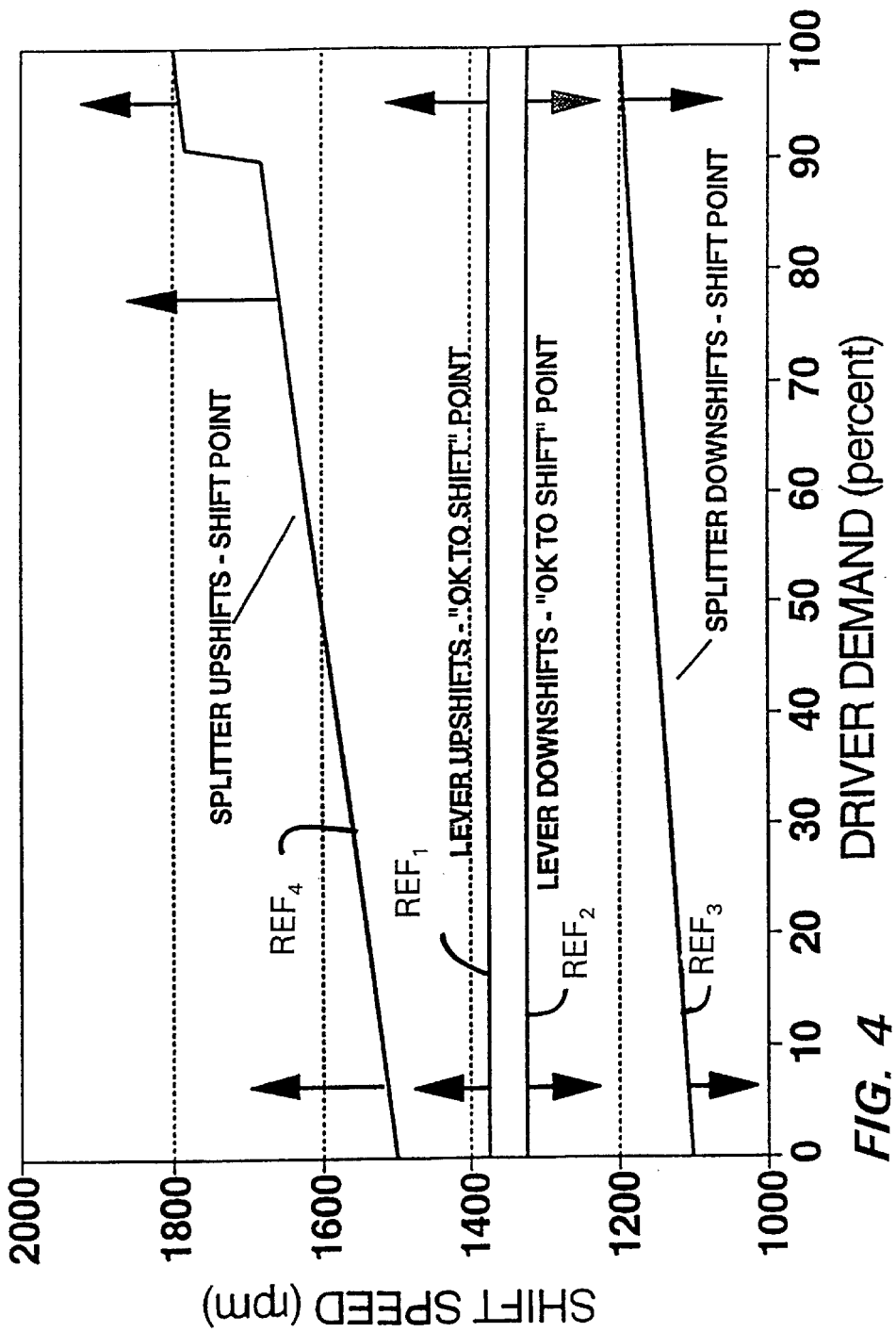
FIG. 4 is a graph illustrating shift point logic for the transmission system of FIG. 3.

When in an even numbered ratio (i.e., when in the high splitter ratio) and above a given engine speed/input shaft speed (for example, about 1,375 RPM for a diesel engine governed to about 2,100 RPM), a lever upshift (with an automatic splitter downshift) is appropriate and the system, if requested by the driver, will semi-automatically implement same. Similarly, when in an odd numbered ratio (i.e., when in the low splitter ratio) and below a given engine speed (for example, about 1,350 RPM for the same engine), a lever downshift (with an automatic splitter upshift) is appropriate and the system, if requested by the driver, will semi-automatically implement same. FIG. 4 illustrates the automatic splitter shift points and the appropriate lever shift points. It is noted that in system 100, splitter shifts are automatically implemented, while lever shifts, with accompanying splitter shifts, require driver initiation and main section jaw clutch manipulation.

The display unit 124 will inform the driver of the currently engaged ratio lever position and the lever position of the currently appropriate lever shift, if any. In one embodiment, the lever position of the currently engaged ratio will be indicated by a steadily lighted button, while the lever position of the appropriate lever shift will be indicated by a flashing button.

Assuming fourth gear is engaged and input shaft speed is 1,525 RPM, the 3/4 button 130 will be steadily lit, indicating that third or fourth gear is engaged and, as an upshift into fifth is appropriate, the 5/6 button 132 will flash. The driver may choose to remain in fourth or decide that a shift into fifth is desirable.

If the driver moves the lever to neutral and neutral is confirmed with the master clutch engaged, the 3/4 button will be extinguished, while the controller 146 issues commands to the engine controller to cause the engine and input shaft speeds to approach the synchronous values therefor, when the appropriate splitter shift is completed (in this example, a splitter shift from splitter-high to splitter-low). Upon confirmation that synchronous conditions exist, the operator may shift easily into the 5/6 lever position without the use of the clutch. Upon confirmation that fifth is engaged, the 5/6 button 132 will be lit in a steady manner.

Preferably, the shift knob 118 will include a sensor or an intent-to-shift button 120 by which the driver will indicate that he intends to initiate a lever shift sequence. Upon receiving the intent-to-shift signal (ITS), the controller 146 will issue commands to the engine controller 112 to relieve torque lock by fuel manipulations and to the auxiliary section actuator 116 to preselect the required splitter shift. This will allow easy shifting from the engaged ratio (fourth) into neutral without operator throttle manipulation or clutch disengagement, as well as providing a rapid splitter shift.

Engine manipulations to relieve torque lock without requiring clutch disengagement is described in greater detail in aforementioned U.S. Pat. Nos. 4,850,236 and 5,105,357. Preferably, if no lever shift is then appropriate, the intent-to-shift signal will not be acted upon.

According to the control of the present invention, as will be described in greater detail below, fueling to break torque will involve causing the engine to develop a gross torque ($T_{EG}$), which will result in a zero flywheel torque ($T_{FW}=0$). As described in aforementioned U.S. Pat. No. 5,508,916, a similar technique may be utilized to assure full engagement of the jaw clutch members associated with a target gear ratio.

When in neutral, the operator normally will develop a rhythm of when to shift into the target ratio. Alternatively, the system may inform the operator of when the engine speed is at or is approaching synchronous sufficiently to allow the lever to be moved into the target lever position. This may be by an audible alarm, a separate "okay-to-shift" light and/or simply changing the frequency of flashing the target lever position button. Alternatively, as shown in U.S. Pat. No. 4,023,443, the disclosure of which is incorporated herein by reference, informing the operator may comprise preventing or inhibiting shifting until properly synchronous conditions exist.

Upon completion of a shift and confirmation thereof, control of fueling is returned to the operator. The clutch pedal 115 is not intended to be used, except for start-from-stop operations. If the clutch is manually disengaged during a shifting operation, throttle control is immediately returned to the operator.

According to another aspect of the present invention, during throttle recovery, to provide a smooth transition back to operator fuel control, the fueling of the engine will be stepped to a value providing zero flywheel torque and then ramped to the driver-requested value.

Output speed (OS) is constantly monitored and, if speed changes cause a change in appropriate or "best gear" during a shift sequence, a new "best gear" will be indicated by a flashing button and will be synchronized for.

In the absence of an intent-to-shift sensor, to accomplish a lever shift (such as a fourth-to-fifth shift), the operator will shift from the 3/4 lever position to neutral, at which time, if the clutch 104 is engaged, the controller will then initiate the required splitter downshift and will fuel the engine 102 to cause synchronous engine and input shaft speed for engaging the fifth gear target ratio ($ES=IS=(OS*3.16)\pm X$). Upon engagement of fifth gear and confirmation thereof, the 5/6 button will be steadily lighted and fueling control will be returned to the operator. Under many operating conditions, the shift to neutral will require operator manipulation of the throttle and/or master clutch.

For control of an at least partially automated vehicular mechanical transmission system, such as system 100, it is desirable under certain circumstances to cause a substantially zero torque condition in the vehicle drive line. This may be accomplished by causing flywheel torque ($T_{FW}$) to equal zero. As will be described in detail below, during jaw clutch disengagement, jaw clutch engagement and/or throttle recovery, it is often desirable to cause the engine to be fueled to generate a gross engine torque which will result in a zero flywheel torque.

For heavy-duty vehicles with electronically controlled engines communicating on data links of the type defined in SAE J1922 and J1939 or ISO 11898 protocols, engine torque may be represented by the relationship:

$$T_{EG}=T_{FW}+T_{BEF}+T_{ACCES}+T_{ACCEL}$$

where:

$T_{EG}$=gross engine torque;

$T_{FW}$=flywheel torque;

$T_{BEF}$=base engine friction torque;

$T_{ACCES}$=accessory torque; and $T_{ACCEL}$=torque to accelerate the engine.

Gross engine torque ($T_{EG}$) and base engine friction torque ($T_{BEF}$), the torque necessary to drive engine manufacturer-supplied devices (such as oil pumps) and to overcome internal engine friction, are parameters available on the electronic data link or databus (DL). Torque to accelerate the engine ($T_{ACCEL}$) is determined as a function of sensed engine acceleration and known engine moment of inertia ($T_{ACCEL}$=dES/dt*$I_{ENGINE}$). It is noted that $T_{ACCEL}$ may have a positive or negative value.

The value of accessory torque ($T_{ACCES}$) may vary substantially and often, as vehicular accessories such as lights, air-conditioning, fan drives and the like are turned off and on automatically or by the vehicle operator and/or passengers. Assuming unaided engine deceleration during defueling of the engine (no engine brake operation), it has been observed that engine accessory torque ($T_{ACCES}$) and engine deceleration rate (dES/dt rate) vary dependently upon each other. Engine deceleration rate (dES/dt rate) is the rate of engine deceleration when the transmission is in neutral and/or the master clutch is fully disengaged, and engine fueling is at a minimal value. As accessory load increases, the engine deceleration rate increases in proportion to it.

When the vehicle is stopped with the engine idling and the transmission in neutral or the master clutch disengaged, accessory torque ($T_{ACCES}$) is substantially equal to gross engine torque minus base engine friction torque ($T_{EG}$-$T_{BEF}$). $T_{EG}$-$T_{BEF}$ is also referred to as "net engine torque." This value is preferably sensed from the databus or data link (DL) and preferably subject to a filtering averaging process.

The system controller 146 is provided with information which relates engine deceleration rate (dES/dt rate) to accessory torque ($T_{ACCES}$) in a predetermined, substantially linear manner wherein engine deceleration rate equals A+(B*accessory torque) where "A" and "B" are predetermined, stored parameters. If dES/dt rate is in units of RPM/second and $T_{ACCES}$ is in units of pound-feet, then "A" will be in units of RPM/second and "B" will be in units of RPM/second/pound-feet. FIG. 7 is a graphical representation of this relationship. Aforementioned U.S. Pat. No. 5,509,867 provides a more detailed description of the preferred method for determining flywheel torque ($T_{FW}$).

As indicated above, in a vehicular mechanical transmission system, when disengaging or engaging jaw clutches and/or when returning control of engine fueling to the operator, it is often important to cause at least a momentary zero drive line torque condition.

With an electronic engine, the engine ECU reports the gross engine torque and the friction torque of the engine and its integral losses (such as oil pump, water pump, etc.). This torque number does not take into account the OEM-installed accessories (such as air-conditioning, alternator, etc.), nor does it take into account the torque to accelerate (or decelerate) the engine.

For example, during acceleration in the low gears of a heavy truck, the torque number reported from the engine is a fairly high number at wide-open throttle. Most of the torque the engine "says" it is producing is going to accelerate the engine rotating inertia, however, and only a portion of that reported torque is going from the flywheel through the clutch to actually move the vehicle.

Furthermore (and more pertaining to this invention), if the truck is just coasting along at some speed with zero throttle, there is negative torque at the flywheel because the vehicle is driving the engine. The gross engine torque usually is reported as zero during this condition. However, it takes torque to "motor" the engine and accessories and accelerate (or decelerate—this subtracts from the zero flywheel torque, since acceleration is negative) the engine. Therefore, it takes some fueling of the engine to create zero torque at the flywheel.

This relationship is represented by the formula:

$$T_{EG}=T_{FW}+T_{BEF}+T_{ACCES}+T_{ACCEL}$$

If zero drive line (i.e., zero flywheel torque) is desired, the formula is rearranged as follows:

$$T_{FW}=0=T_{EG}-T_{BEF}-T_{ACCES}-T_{ACCEL}$$

or $$T_{EG} \text{ (for zero flywheel torque)}=T_{BEF}+T_{ACCES}+T_{ACCEL}$$

A simpler version may be made if $T_{ACCEL}$ is not taken into account (i.e., if vehicle acceleration when algorithm is needed is assumed to be low). Now, at any given time, the gross engine torque that should be commanded to create a zero torque condition at the flywheel (and in the drive line) is known.

In an automated transmission system, upon commanding a shift from a currently engaged gear ratio into neutral, the engine may be commanded to the $T_{EG}$ (for zero flywheel torque) or to dither to values just greater than and just less than the $T_{EG}$ value. A similar logic may be utilized during engagement of jaw clutches to assure full insertion thereof.

By knowing the values corresponding to zero drive line torque, overshooting to cause a momentary torque reversal is minimized and/or eliminated and a greater time is spent at or near actual zero drive line torque.

Figure 5A:
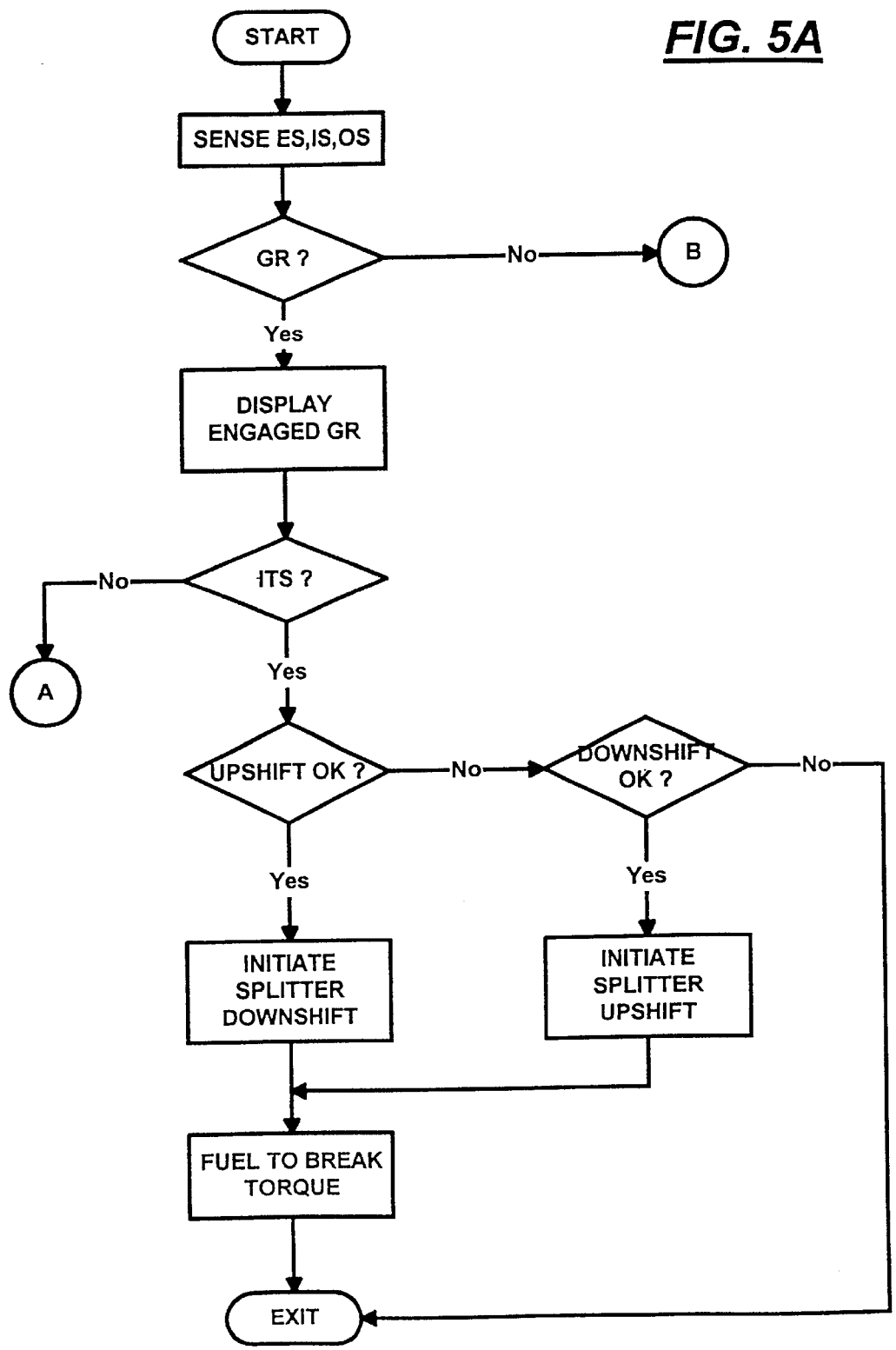
FIGS. 5A–5D are schematic illustrations, in flow chart format, of control logic for the system of FIG. 3.
Figure 5B:
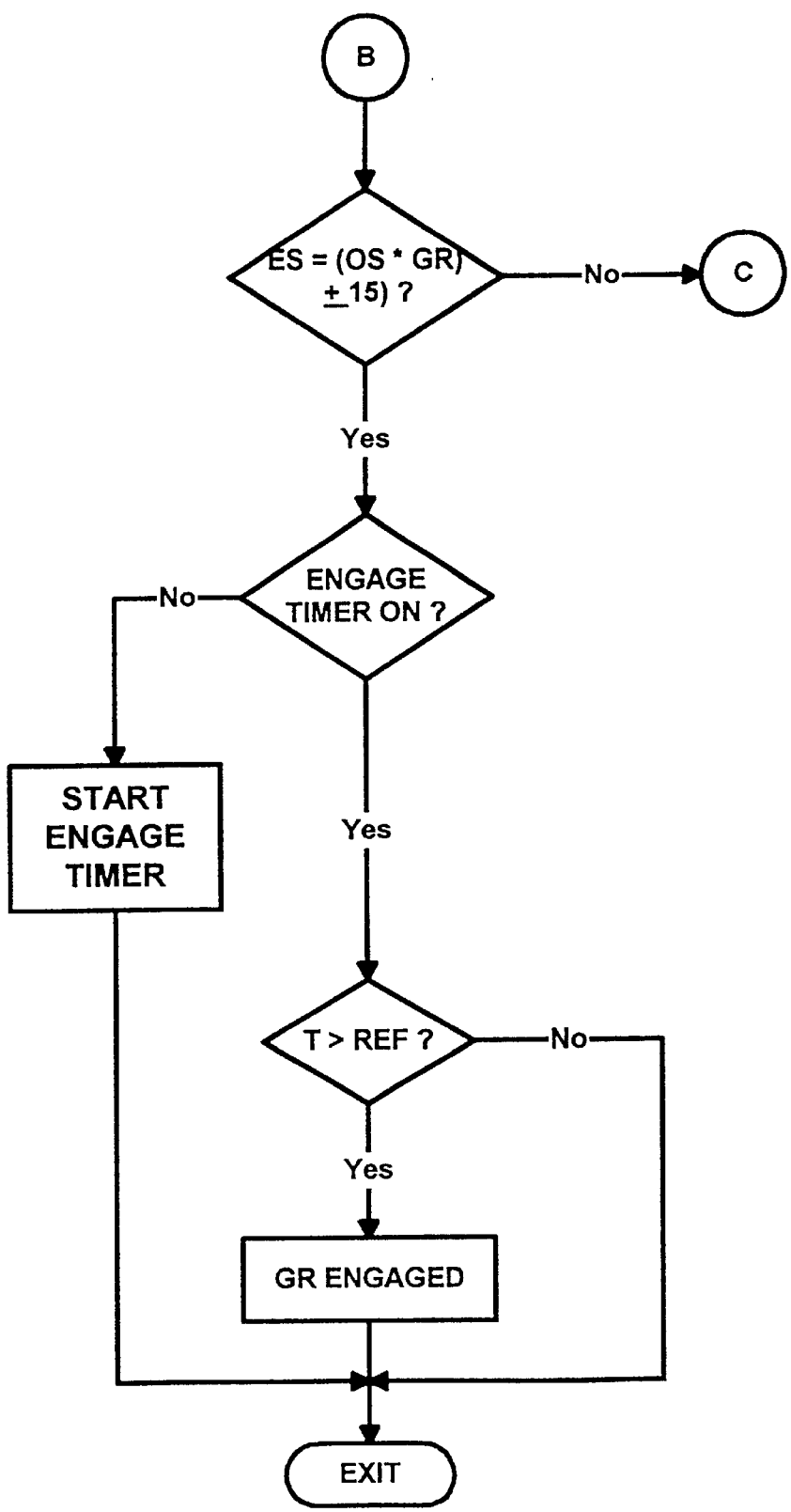
Figure 5C:
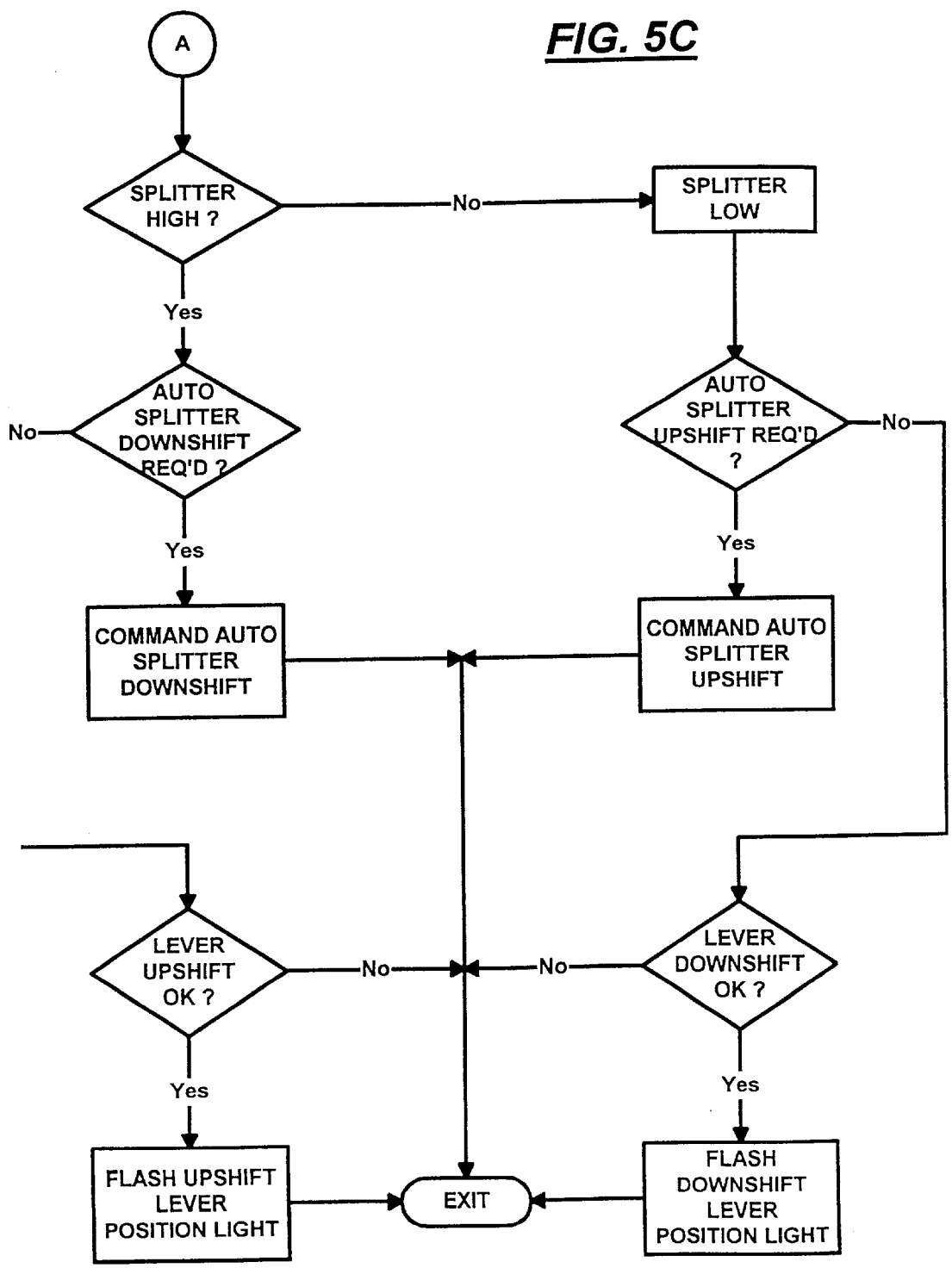
Figure 5D:
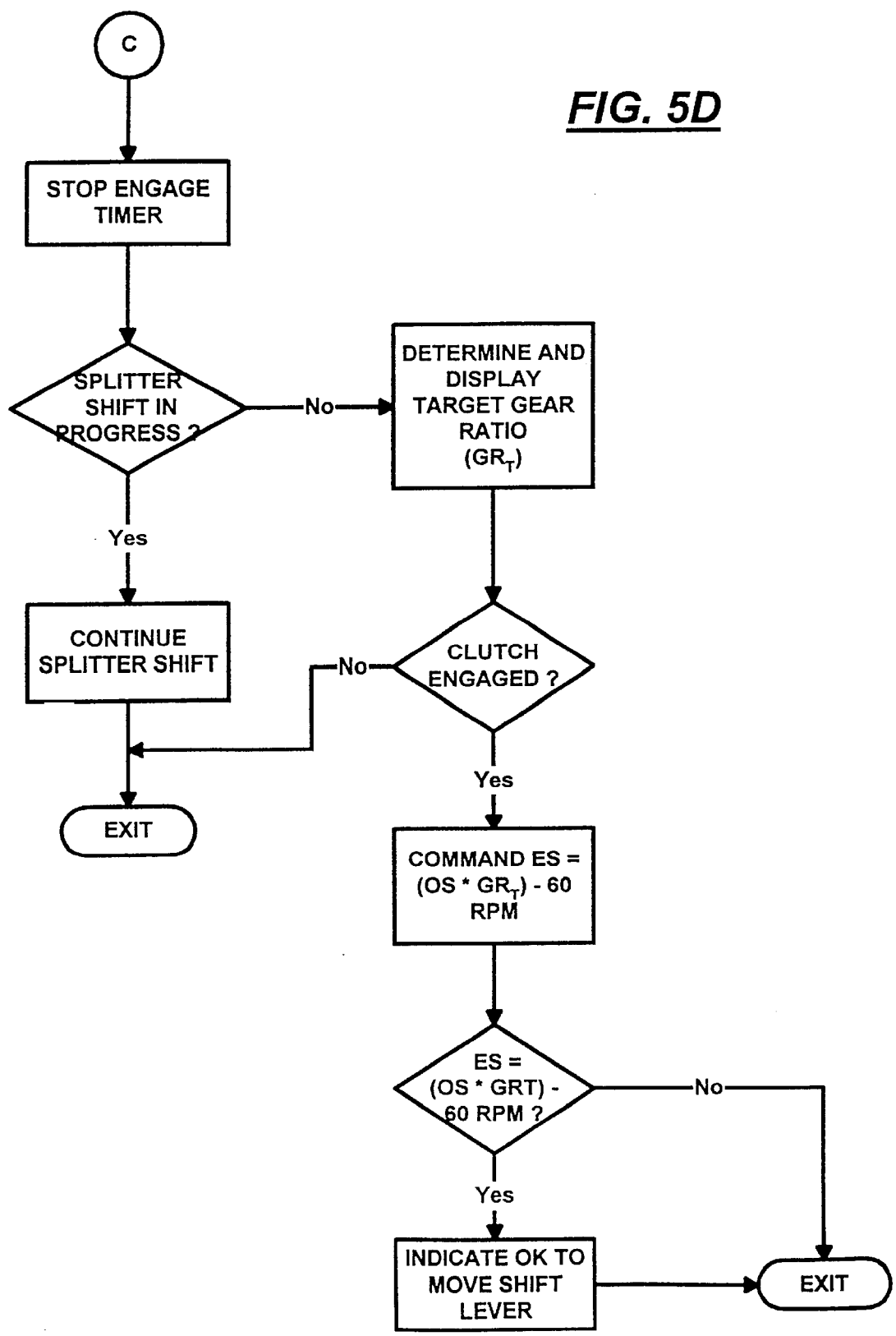
Figure 6:
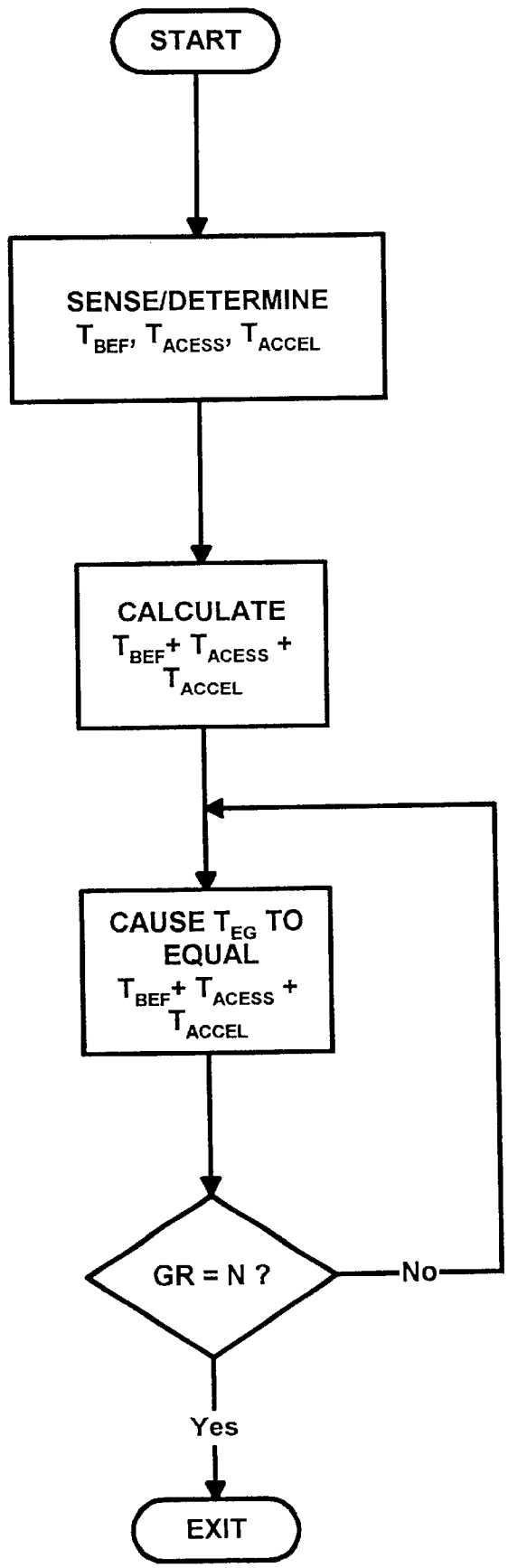
FIG. 6 is a schematic illustration, in flow chart format, of the control logic of the present invention.

FIG. 6 is a graphical representation of the logic block "FUEL TO BREAK TORQUE" in FIG. 5A utilizing the control of the present invention.

In a semi-automatic shift implementation system, fueling for zero flywheel torque may be momentarily commanded whenever the throttle pedal is released and/or whenever the throttle pedal is reapplied. Preferably, the zero flywheel torque condition will be commanded for only about 200 to 600 milliseconds, which should be relatively transparent to the operator but sufficient to allow an easier shift into neutral if that is the event indicated by the sensed throttle manipulation. In a preferred embodiment, (a) whenever the accelerator pedal is released, zero flywheel torque is commanded for about 400 milliseconds; and (b) whenever the accelerator pedal is reapplied, zero flywheel torque is commanded for about 250 milliseconds.

It also has been noted that during throttle recovery operations, especially if the operator is requesting greater than 5% of maximum throttle, a smooth throttle recovery is accomplished by first fueling to the $T_{EG}$ (for zero drive line torque) and from that level, smoothly ramping up to the engine fueling level requested by the operator's throttle position.

Although the present invention has been described with a certain degree of particularity, it is understood that the description of the preferred embodiment is by way of example only and that numerous changes to form and detail are possible without departing from the spirit and scope of the invention as hereinafter claimed.

What is claimed is:

1. A manually shifted vehicular transmission system comprising:

a transmission section having an input shaft driven by a fuel-controlled engine, an output shaft, a plurality of selectably engageable and disengageable drive ratios, and a selectable neutral, all of said drive ratios and neutral selected by means of selectively engaged and disengaged jaw clutches operatively positioned by a manually operated shift lever having a plurality of shift lever positions;

means to sense a transmission section neutral condition;

means to determine a forward target gear ratio; and means to automatically control fueling of the engine, said means effective, upon sensing transmission section neutral, to cause the engine to achieve a synchronous speed for engaging said target gear ratio.

2. The system of claim 1 wherein said transmission section comprises a main transmission section (12) of a compound transmission.

3. The system of claim 1 further comprising means to sense engagement of said target gear ratio, said means to automatically control fueling effective to cause engine fueling to be in accordance with operator demand upon sensed engagement of said target ratio.

4. T he system of claim 1 wherein said jaw clutches are non-synchronized jaw clutches.

5. The system of claim 1 wherein said engine is drivingly connected to said input shaft by a manually controllable friction clutch and further comprising means for sensing a non-engaged condition of said friction clutch, said means to automatically control fueling effective to cause engine fueling to be in accordance with operator demand upon sensed non-engagement of said friction clutch.

6. The system of claim 3 wherein said engine is drivingly connected to said input shaft by a manually controllable friction clutch and further comprising means for sensing a non-engaged condition of said friction clutch, said means to automatically control fueling effective to cause engine fueling to be in accordance with operator demand upon sensed non-engagement of said friction clutch.

7. The system of claim 4 wherein said engine is drivingly connected to said input shaft by a manually controllable friction clutch and further comprising means for sensing a non-engaged condition of said friction clutch, said means to automatically control fueling effective to cause engine fueling to be in accordance with operator demand upon sensed non-engagement of said friction clutch.

8. The system of claim 1 further comprising means to sense conditions indicative of an operator intent to shift into transmission section neutral from a currently engaged ratio, said means to automatically control fueling effective to cause the engine to be fueled to minimize torque at currently engaged jaw clutches in response to sensing said conditions indicative of an operator intent to shift into transmission section neutral.

9. The system of claim 3 further comprising means to sense conditions indicative of an operator intent to shift into transmission section neutral from a currently engaged ratio, said means to automatically control fueling effective to cause the engine to be fueled to minimize torque at currently engaged jaw clutches in response to sensing said conditions indicative of an operator intent to shift into transmission section neutral.

10. The system of claim 4 further comprising means to sense conditions indicative of an operator intent to shift into transmission section neutral from a currently engaged ratio, said means to automatically control fueling effective to cause the engine to be fueled to minimize torque at currently engaged jaw clutches in response to sensing said conditions indicative of an operator intent to shift into transmission section neutral.

11. The system of claim 5 further comprising means to sense conditions indicative of an operator intent to shift into transmission section neutral from a currently engaged ratio, said means to automatically control fueling effective to cause the engine to be fueled to minimize torque at currently engaged jaw clutches in response to sensing said conditions indicative of an operator intent to shift into transmission section neutral.

12. The system of claim 3 further comprising sensors for providing input signals indicative of input shaft and output shaft speeds, said means to sense engagement of said target gear ratio making such determination as a function of said speed signals.

13. The system of claim 1 further comprising sensors for providing input signals indicative of input shaft and output shaft speeds, and means for sensing engagement of said drive ratios as a function of said speed signals.

14. The control system of claim 1 wherein said engine includes a microprocessor-based engine controller mounted to said engine and having a memory, said means to sense transmission neutral, determine a target gear ratio and automatically control fueling comprising logic rules stored in said memory.

15. The control system of claim 1 wherein said engine includes a microprocessor-based engine controller having a memory, said means to determine a target gear ratio and to automatically control fueling comprising logic rules stored in said memory.

16. The control system of claim 5 wherein said engine includes a microprocessor-based engine controller having a memory, said means to determine a target gear ratio and to automatically control fueling comprising logic rules stored in said memory.

17. The control system of claim 6 wherein said engine includes a microprocessor-based engine controller having a memory, said means to determine a target gear ratio and to automatically control fueling comprising logic rules stored in said memory.

18. The control system of claim 8 wherein said engine includes a microprocessor-based engine controller having a memory, said means to determine a target gear ratio and to automatically control fueling comprising logic rules stored in said memory.

19. The control system of claim 9 wherein said engine includes a microprocessor-based engine controller having a memory, said means to determine a target gear ratio and to automatically control fueling comprising logic rules stored in said memory.

20. The control system of claim 11 wherein said engine includes a microprocessor-based engine controller having a memory, said means to determine a target gear ratio and to automatically control fueling comprising logic rules stored in said memory.

21. A microprocessor-based system controller for controlling a manually shifted vehicular transmission system comprising a transmission section having an input shaft driven by a fuel-controlled engine, an output shaft, a plurality of selectably engageable and disengageable drive ratios, and a selectable neutral, all of said drive ratios and neutral selected by means of selectively engaged and disengaged jaw clutches operatively positioned by a manually operated shift lever having a plurality of shift lever positions, said system controller having a memory storing logic rules effective:

to sense a transmission section neutral condition;

to determine a forward target gear ratio;

to automatically control fueling of the engine, including, upon sensing transmission section neutral, causing the engine to achieve a synchronous speed for engaging said target gear ratio; and to sense engagement of said target gear ratio and to automatically cause engine fueling to be in accordance with operator demand upon sensed engagement of said target gear ratio.

22. The system controller of claim 15 wherein said engine is drivingly connected to said input shaft by a manually controllable friction clutch, said logic rules further comprising logic rules for sensing a non-engaged condition of said friction clutch, and to automatically cause engine fueling to be in accordance with operator demand upon sensed non-engagement of said friction clutch.

23. A microprocessor-based system controller for controlling a manually shifted vehicular transmission system comprising a transmission section having an input shaft driven through a manually controllable friction clutch by a fuel-controlled engine, an output shaft, a plurality of selectably engageable and disengageable drive ratios, and a selectable neutral, all of said drive ratios and neutral selected by means of selectively engaged and disengaged jaw clutches operatively positioned by a manually operated shift lever having a plurality of shift lever positions, said system controller having a memory storing logic rules effective:

to sense a transmission section neutral condition;

to determine a forward target gear ratio;

to automatically control fueling of the engine, and effective, upon sensing transmission section neutral, to cause the engine to achieve a synchronous speed for engaging said target gear ratio; and for sensing a non-engaged condition of said friction clutch and to automatically cause engine fueling to be in accordance with operator demand upon sensed non-engagement of said friction clutch.

24. The microprocessor-based system controller of claim 23, wherein said transmission section comprises a main transmission of a compound transmission.

25. The microprocessor-based system controller of claim 23, wherein said jaw clutches are non-synchronized jaw clutches.

26. The microprocessor-based system controller of claim 23, further comprising sensors for providing input signals indicative of input shaft and output shaft speeds, and means for sensing engagement of said drive ratios as a function of said speed signals.

27. The system as defined in claim 1, further comprising an operator display, and wherein the operator display is operable for indicating the lever position of the currently engaged gear ratio.

28. The system as defined in claim 27, wherein the operator display indicates the lever position by a steadily lighted button.

29. The system as defined in claim 1, further comprising an operator display, and wherein the operator display is operable for indicating the lever position of an appropriate lever shift.

30. The system as defined in claim 29, wherein the lever position is indicated by a flashing button.

31. A method for controlling a manually shifted vehicular transmission system including a transmission section and an engine, said method comprising:

sensing a tranmission section neutral condition;

determining a forward target gear ratio;

automatically controlling fueling of the engine, including, upon sensing transmission section nuetral, causing the engine to achieve a synchronous speed for engaging said forward target gear ratio; and sensing engagement of said forward target gear ratio and automatically causing engine fueling to be in accordance with operator demand upon sensed engagement of said target gear ratio.

32. The method of claim 31, wherein said engine is drivingly connected to an input shaft by a manually controllable friction clutch, said method further comprising sensing a non-engaged condition of said friction clutch, and automatically causing engine fueling to be in accordance with operator demand upon sensed non-engagement of said friction clutch.

33. A control method for manually shifted vehicular transmission system including a transmission section and an engine, comprising:

determining engine fueling necessary to cause zero flywheel torque;

controlling fueling to cause zero flywheel torque;

sensing a transmission section nuetral condition; and determining a forward target gear ratio.

34. The control method of claim 33, further comprising:

automatically controlling fueling of the engine, including, upon sensing transmission section nuetral, causing the engine to achieve a sychronous speed for engaging said forward target gear ratio.

35. The control method of claim 34, wherein said engine is drivingly connected to an input shaft by a manually controllable friction clutch, said method further comprising sensing a non-engaged condition of said friction clutch, and automatically case engine fueling to be in accordance with operator demand upon sensed non-engagement of said friction clutch.

* * * * *